United States Patent [19]
Maruo et al.

[11] Patent Number: 5,282,190
[45] Date of Patent: Jan. 25, 1994

[54] DATA STORAGE DISK DRIVE WITH A PIEZOELECTRIC MEMBER AND A RESILIENT MEMBER BETWEEN A HEAD AND A DISK

[75] Inventors: Tsunehiro Maruo, Kanagawa; Junichi Toyoda, Tokyo, both of Japan

[73] Assignee: Sony Corporation, Tokyo, Japan

[21] Appl. No.: 883,273

[22] Filed: May 14, 1992

[30] Foreign Application Priority Data

May 24, 1991 [JP] Japan .................................. 3-120222

[51] Int. Cl.$^5$ ............................................. G11B 17/32
[52] U.S. Cl. ................................. 369/115; 369/44.11; 360/105; 360/109
[58] Field of Search ............ 369/115, 44.11, 100, 369/215; 360/104, 105, 119

[56] References Cited

U.S. PATENT DOCUMENTS

| 3,688,287 | 8/1972 | Perry | 340/261 |
| 4,947,077 | 8/1990 | Murata | 310/328 |
| 5,050,157 | 9/1991 | Miura et al. | 369/215 |
| 5,191,624 | 3/1993 | Ito et al. | 369/44.11 |

FOREIGN PATENT DOCUMENTS

| 52-17811 | 2/1977 | Japan | G11B 5/60 |
| 57-210479 | 12/1982 | Japan | G11B 17/32 |
| 61-178786 | 8/1986 | Japan | G11B 21/21 |
| 63-129515 | 6/1988 | Japan | G11B 5/60 |

Primary Examiner—Paul M. Dzierzynski
Assistant Examiner—Drew A. Dunn
Attorney, Agent, or Firm—Philip M. Shaw, Jr.

[57] ABSTRACT

A data storage disk drive includes an optical head positioned in spaced relationship to the data storage disk by a holder for an objective lens and a piezoelectric body and a resilient body which are mounted on a surface of the holder which faces the data storage disk. An AC power supply applies an AC voltage to the piezoelectric body to produce a flexural standing wave that keeps the resilient body in quasi contact with the data storage disk for making substantially constant a gap between the optical head and the data storage disk.

8 Claims, 5 Drawing Sheets

DATA STORAGE DISK DRIVE WITH A PIEZOELECTRIC MEMBER AND A RESILIENT MEMBER BETWEEN A HEAD AND A DISK

BACKGROUND OF THE INVENTION

1. Field of the Invention

The present invention relates to a data storage disk drive having an optical head, a magnetic head, or a magneto-optic head for reproducing data from and/or recording data on a data storage disk such as a compact disk (CD), a video disk (VD), a magneto-optic disk, a magnetic hard disk, or the like.

2. Description of the Prior Art

Some data storage disk drives have optical heads, such as optical pickups, for reproducing data from and/or recording data on CDs, VDs, magneto-optic disks, or the like. Such a data storage disk drive includes an actuator for moving the objective lens of an optical pickup toward and away from a disk surface along its optical axis normal to the disk surface, and a detector for detecting changes in the distance between the objective lens and the disk surface due to disk surface fluctuations, based on the astigmatic principles or the like. To prevent a laser beam applied to the disk surface by the optical pickup from being out of focus on the disk surface, the actuator is controlled based on a focusing servo signal from the detector to move the objective lens for keeping the objective lens spaced a constant distance from the disk surface at all times regardless of disk surface fluctuations.

Figure 1:
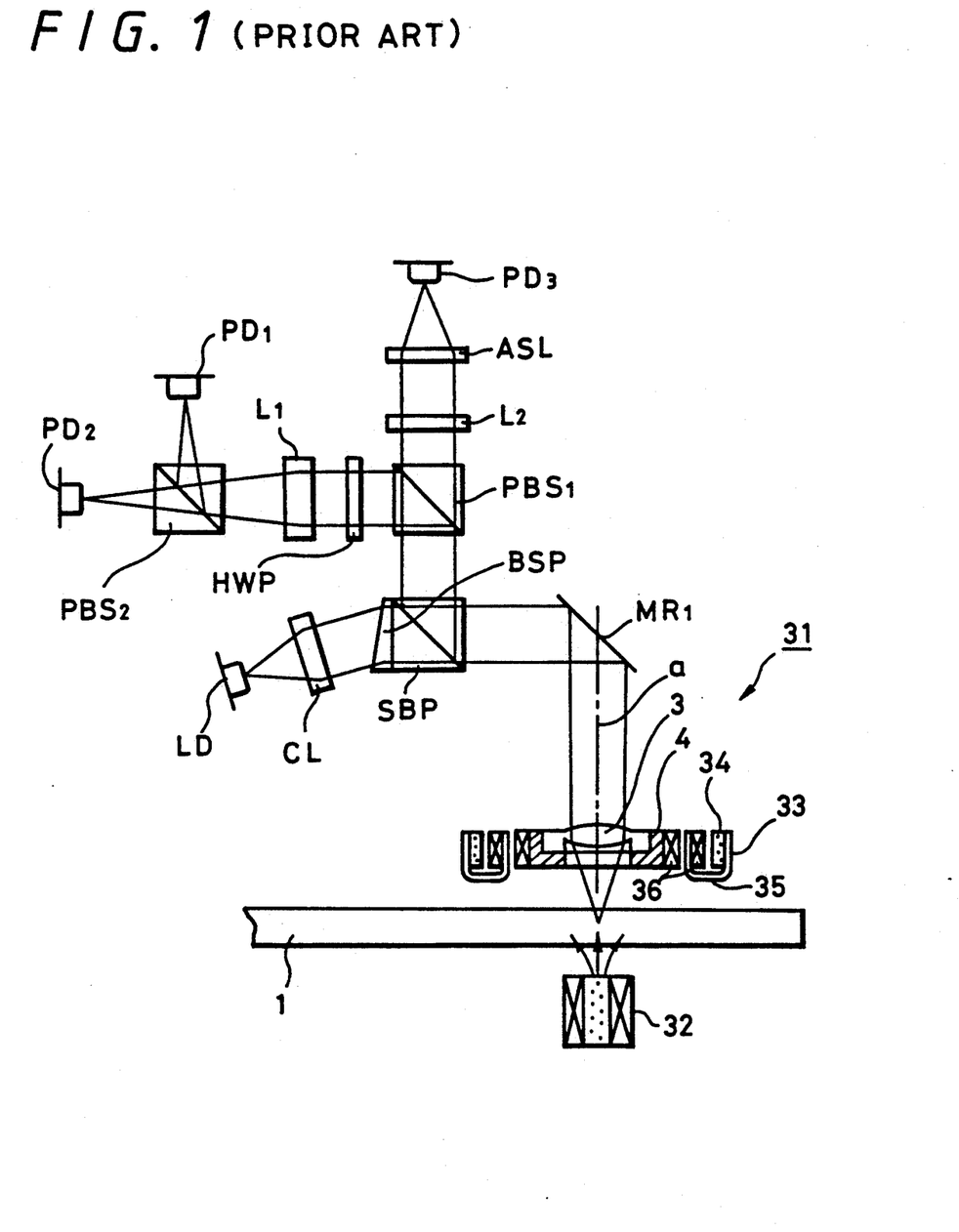
FIG. 1 is a conventional data storage disk drive.

FIG. 1 of the accompanying drawings shows a conventional data storage disk drive having a magneto-optic head assembly capable of reading data from and writing data on a magneto-optic disk 1.

As shown in FIG. 1, the magneto-optic head assembly includes an optical head 31 for applying a laser beam to the magneto-optic disk 1, the optical head 31 being positioned on one side of the magneto-optic disk 1, and a magnetic head 32 for generating and applying a DC magnetic field to the region of the magneto-optic disk 1 where the laser beam is applied.

The optical head 31 has an objective lens 3 held in position by a holder 4, and an actuator 33 for keeping the optical axis a of the objective lens 3 perpendicular to the surface of the magneto-optic disk 1 and also for slightly moving the holder 4 and hence the objective lens 3 toward and away from the magneto-optic disk 1 along the optical axis a.

The actuator 33 comprises a coil 36 mounted on the holder 4 and magnetically coupled to a yoke 35 having a magnet 34. When the coil 36 is supplied with a servo signal current, the actuator 33 moves the holder 4 slightly along the optical axis a. The optical head 31 has an optical system including the objective lens 3, the optical system having a laser diode LD for emitting a linearly polarized laser beam. The linearly polarized laser beam emitted from the laser diode LD is converted by a collimator lens CL into a parallel laser beam that is applied through a beam shaper prism BSP and a special beam splitter SBP to a mirror MR1. The laser beam is reflected by the mirror MR1 to pass through the objective lens 3 which focuses the laser beam on the magneto-optic disk 1.

Depending on the information recorded on the magneto-optic disk 1, the laser beam as it is reflected by the magneto-optic disk 1 has its plane of polarization rotated due to the Kerr effect. The laser beam that has returned from the magneto-optic disk 1 is reflected by the mirror MR1 toward the beam splitter SBP. The beam splitter SBP is arranged such that it substantially fully reflects an S-polarized component of the laser beam and it transmits 50% of a P-polarized component of the laser beam and reflects the remaining 50% of the P-polarized component. The S-polarized component, which has been generated by the recorded information on the magneto-optic disk 1, is therefore reflected by the beam splitter SBP toward a polarizer beam splitter $PBS_1$.

The S-polarized component that is reflected by the polarizer beam splitter $PBS_1$ is divided into two perpendicular linearly polarized beams by a $\frac{1}{2}\lambda$ plate HWP, a condensing lens $L_1$, and a polarizer beam splitter $PBS_2$. These two linearly polarized beams are applied respectively to photodetectors $PD_1$, $PD_2$ such as photodiodes of an information signal recording/reproducing system, which then differentially produces an information output based on the two linearly polarized beams applied to the photodetectors $PD_1$, $PD_2$.

The S-polarized component that is transmitted through the polarizer beam splitter $PBS_1$ is focused by a lens $L_2$ onto a central area of a photodetector $PD_3$ such as a four-segment photodiode, for example. An astigmatic cylindrical lens ASL is placed between the lens $L_2$ and the photodetector $PD_3$. If the laser beam applied to the magneto-optic disk 1 is out of focus, then the S-polarized component as it is applied to the photodetector $PD_3$ is made asymmetric in spot shape by the astigmatic cylindrical lens ASL.

When such a defocused condition is detected by the photodetector $PD_3$, a servo signal is supplied to the coil 36 of the actuator 33, which then moves the objective lens 3 along the optical axis a in a direction to bring the laser beam into focus on the magneto-optic disk 1. In this manner, the laser beam applied to the magneto-optic disk 1 by the optical head 31 remains focused on the magneto-optic disk 1 at all times.

Consequently, the objective lens 3 is spaced a constant distance from the magneto-optic disk 1 irrespective of disk surface fluctuations, by a servomechanism, which is composed of the actuator 33 and a servo control circuit for controlling the actuator 33. However, such a servomechanism is relatively complex with respect to its mechanical and circuit arrangements.

A magnetic head for recording data on and reproducing data from a magnetic data storage disk such as a magnetic hard disk is usually in the form of a floating magnetic head.

Figure 2:
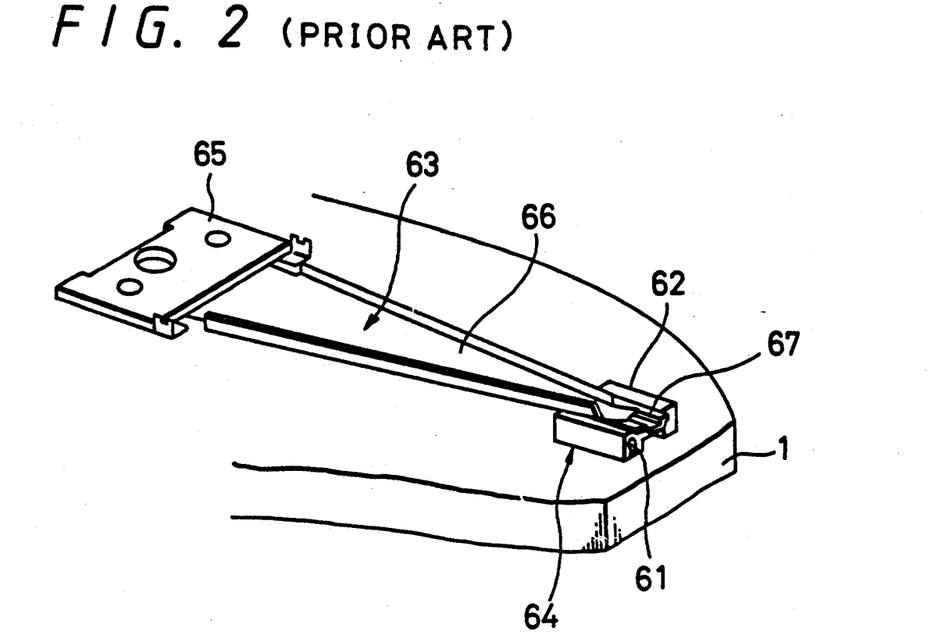
FIG. 2 is a perspective view of a conventional disk drive having a floating magnetic head.
Figure 3:
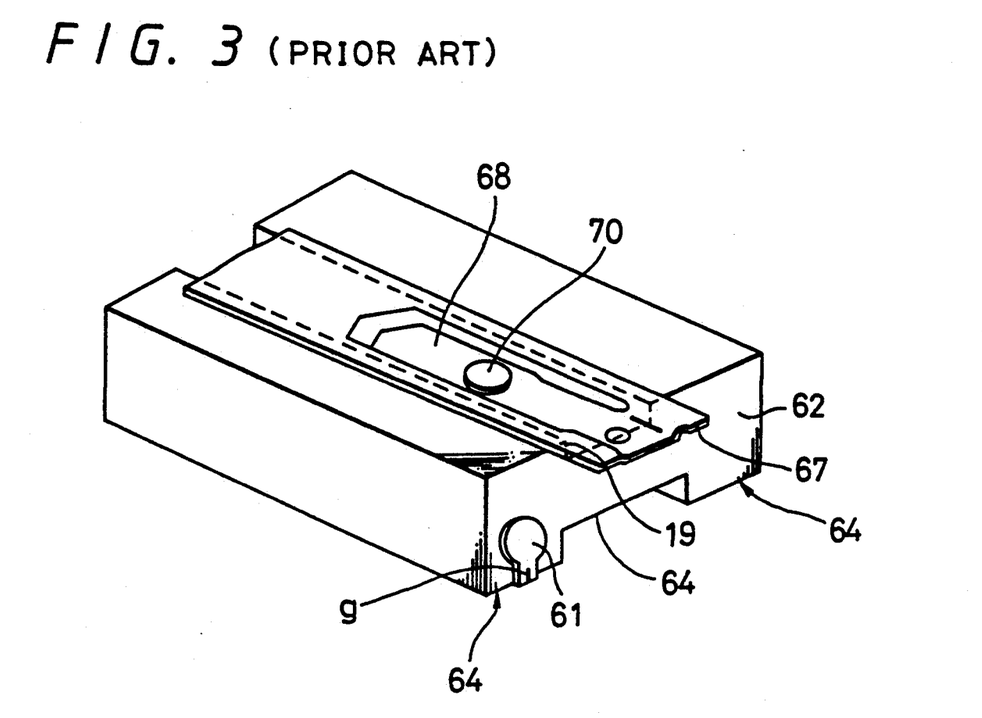
FIG. 3 is an enlarged perspective view of a slider, a magnetic head, and a gimbal of the disk drive shown in FIG. 2.

One conventional floating magnetic head is shown in FIGS. 2 and 3 of the accompanying drawings.

As shown in FIGS. 2 and 3, a slider 62 is positioned off the surface of a magnetic data storage disk 1 such as a magnetic hard disk, and a thin-film magnetic head 61 is mounted on the slider 62. As shown in FIG. 2, the slider 62 is mounted on a distal end of a gimbal mechanism 63 and normally resiliently urged toward the magnetic data storage disk 1 under pressure by the gimbal mechanism 63.

As shown FIG. 3, the slider 62 has a rail 64 on its surface facing the magnetic data storage disk 1. When the magnetic data storage disk 1 rotates, an air flow is generated along the rail 64, forcing the slider 62 to be lifted a small distance off the surface of the disk 1 against the resiliency of the gimbal mechanism 63. The surface of the slider 62 which faces the magnetic data storage disk 1, i.e. the rail 64, serves as an air bearing surface. The magnetic head 61 is mounted on the slider 62 such that the magnetic gap of the magnetic head 61 faces the air bearing surface 64.

As shown in FIG. 2, the gimbal mechanism 63 comprises a base plate 65 fixed to a stationary component, a tapered triangular load beam 66 having one end welded to the base plate 65, and a gimbal 67 mounted on the distal end of the load beam 66. The base plate 65, the load beam 66, and the gimbal 67 are made of stainless steel sheet.

As shown in FIG. 3, the gimbal 67 has a resilient tongue 68 which may be cut out of a central area of the gimbal 67. The resilient tongue 68 is bonded to a surface of the slider 62 opposite to the air bearing surface 64 by a resilient adhesive. The resilient tongue 68 has a projection 70 on which the distal end of the load beam 66 is supported in resilient engagement. The slider 62 is coupled to the load beam 66 through the projection 70 on the resilient tongue 68 so that the slider 62 is swingable about the projection 70.

In operation, the slider 62 with the magnetic head 61 is caused to float off the surface of the disk 1 by an air flow that is generated beneath the slider 62 when the magnetic data storage disk 1 rotates. Therefore, the magnetic head 61 remains spaced a certain distance from the surface of the disk 1.

The spacing between the disk 1 and the magnetic head 61 is determined by the air flow produced beneath the slider 62 and the resilient force of the gimbal mechanism 63. It requires a considerable technological level to establish and maintain a desired spacing between the disk 1 and the magnetic head 61. A highly complex process is needed to manufacture and assemble the magnetic disk drive shown in FIGS. 2 and 3. It is therefore difficult to produce magnetic disk drives to desired design specifications.

A floating magnetic head disclosed in Japanese laid-open patent publication No. 52-17811 has an electrostrictive vibrator disposed in a slider. In order to avoid a head crash which might be caused because of a small distance between the magnetic head and a disk surface, the force acting in the gap between the magnetic head and the disk surface and tending to force the magnetic head to float from the disk surface is increased by the electrostrictive vibrator, which is of a laminated structure disposed in the slider, as it transversely vibrates in a direction normal to the disk surface. However, the distance by which the magnetic head floats off the disk surface is essentially determined by an air flow produced upon relative movement of the magnetic head and the disk. Therefore, the problems noted above are not solved by the disclosed floating magnetic head.

Japanese laid-open patent publication No. 57-210479 also discloses a floating magnetic head which includes a piezoelectric body disposed in a slider. When a voltage is applied to the piezoelectric body, the thickness of the slider is increased to adjust a small gap between the magnetic head and a disk surface. Since the distance between the magnetic head and the disk surface is also essentially determined by an air flow produced upon relative movement of the magnetic head and the disk, the disclosed floating magnetic head fails to provide a solution to the aforesaid problems.

A floating magnetic head disclosed in Japanese laid-open patent publication No. 61-178786 comprises a piezoelectric slider. The piezoelectric slider doubles as a shock sensor for detecting a shock applied to the magnetic head. The problems discussed above are not addressed in this publication.

According to Japanese laid-open patent publication No. 63-129515, a floating head has a flexible member and a deforming means which is actuatable by an external signal. The disclosure is directed to the relationship between a slider and a head, and does not show a solution to the above problems since the slider is caused to float off the disk surface by an air flow produced upon relative movement of the disk and the slider.

OBJECTS AND SUMMARY OF THE INVENTION

It is an object of the present invention to provide a data storage disk drive having an optical head, a magnetic head, or a magneto-optic head for reproducing data from and/or recording data on a data storage disk such as a compact disk, a video disk, a magneto-optic disk, a magnetic hard disk, or the like, the data storage disk drive device being relatively simple in structure, easy to manufacture and assemble, and high in accuracy regardless of the positional requirement to be met between the head and a data storage disk.

According to the present invention, there is provided a data storage disk drive for recording data on and reproducing data from a data storage disk, comprising an optical head positioned in spaced relationship to the data storage disk, the optical head comprising a holder, an objective lens supported on the holder, a piezoelectric body and a resilient body which are mounted on a surface of the holder which faces the data storage disk, and means for applying an AC voltage to the piezoelectric body to produce a flexural wave for making substantially constant a gap between the optical head and the data storage disk.

According to the present invention, there is also provided a data storage disk drive for recording data on and reproducing data from a data storage disk, comprising a support, a magnetic head supported on the support and positioned in spaced relationship to the data storage disk, a piezoelectric body and a resilient body which are mounted on a surface of the support which faces the data storage disk, and means for applying an AC voltage to the piezoelectric body to produce a flexural wave for making substantially constant a gap between the magnetic head and the data storage disk at least while the data storage disk is rotating.

The piezoelectric body is attached to the support, and the resilient body is attached to the piezoelectric body.

The data storage disk drive further includes a pair of electrodes disposed respectively on opposite surfaces of the piezoelectric body, the means comprising an AC power supply connected between the electrodes.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 4:
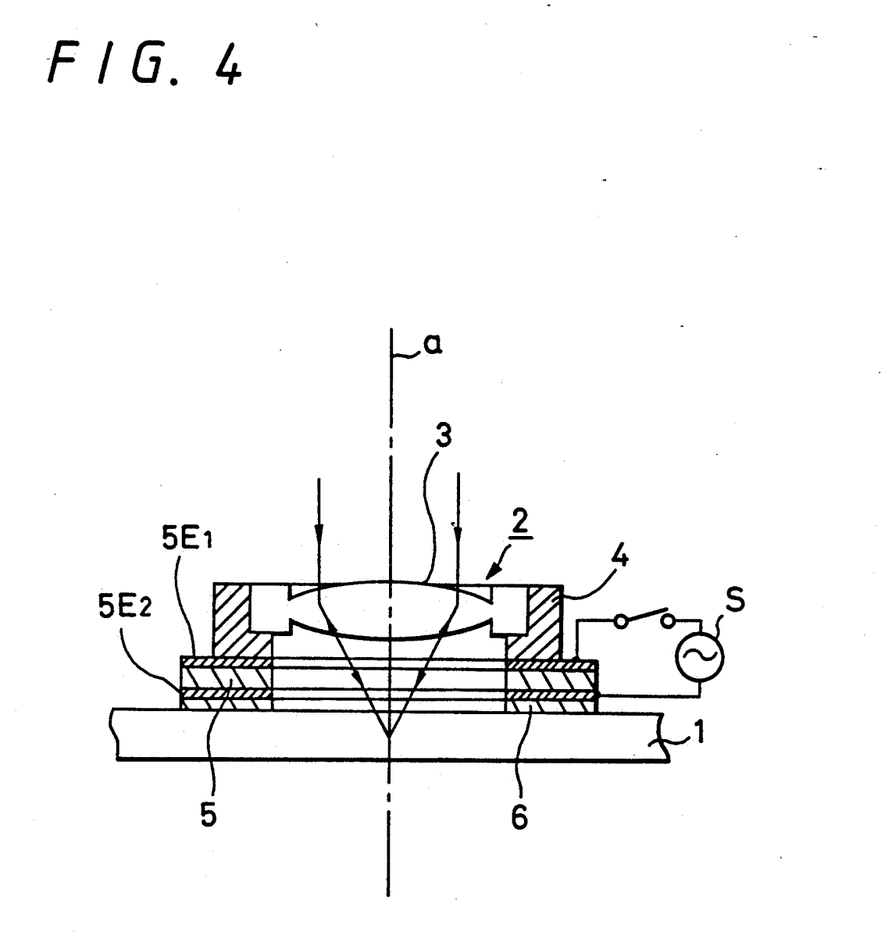
FIG. 4 is a cross-sectional view of a portion of a data storage disk drive according to an embodiment of the present invention.

FIG. 4 shows an optical head of a data storage disk drive according to an embodiment of the present invention.

As shown in FIG. 4, an optical head, generally designated by the reference numeral 2, has a laser diode and an optical system which are similar to those shown in FIG. 1. The other components of the optical system than an objective lens 3 are omitted from illustration. The optical system does not have components, corresponding to the beam splitter $PBS_1$, the lens $L_2$, the cylindrical lens ASL, and the photodetector $PD_3$, shown in FIG. 1, for generating a focusing servo signal. Furthermore, the objective lens 3 is supported on a holder 4, which is not equipped with a focusing actuator for moving the objective lens 3 along the optical axis a perpendicular to the surface of a data storage disk 1 in the form of a magneto-optic disk.

To the surface of the holder 4 which faces the data storage disk 1, there are attached a ring-shaped, relatively thin piezoelectric body 5 made of a $PbTiO_3$–$PbZrO_3$ piezoelectric ceramic material or the like, and a ring-shaped, relatively thin resilient body 6 of SUS, Al, brass, or the like. The piezoelectric body 5 is mounted on the holder 4, and the resilient body 6 is mounted on the piezoelectric body 5.

Electrodes $5E_1$, $5E_2$ are attached to respective principal surfaces of the piezoelectric body 5. An AC power supply S such as a high-frequency power supply is connected between the electrodes $5E_1$, $5E_2$ to apply an electric field to the piezoelectric body 5 in the transverse direction thereof.

In the illustrated embodiment, the resilient body 6 is positioned in facing relationship to the data storage disk 1. However, the piezoelectric body 5 and the resilient body 6 may be positionally switched around so that the piezoelectric body 5 faces the data storage disk 1.

When an AC voltage of a certain high frequency is applied transversely to the piezoelectric body 5 by the power supply S, the piezoelectric body 5 induces a mechanical stress in the transverse direction thereof, thereby producing a flexural standing wave in response to the expansion and contraction of the piezoelectric body 5.

The gap between the objective lens 3 and the data storage disk 1 is primarily determined by the holder 4, the piezoelectric body 5, and the resiliency body 6 that are interposed between the objective lens 3 and the data storage disk 1. In addition, the resilient body 6 and the data storage disk 1 are held in quasi contact with each other because of the amplitude of the flexural wave produced by the piezoelectric body 5 when the AC voltage is applied thereto. Accordingly, the net gap between the objective lens 3 and the data storage disk 1 is the sum of a physical gap therebetween and an average gap produced by the amplitude of the flexural wave produced by the piezoelectric body 5.

More specifically, when the AC voltage is applied to the piezoelectric body 5, it transversely vibrates or expands and contracts, generating a standing wave in the transverse direction. The standing wave causes the resilient body 6 to be repeatedly deformed between positions indicated by $b_1$, $b_2$ (See FIG. 7). By selecting the amplitude of the standing wave, i.e., the magnitude of the applied AC voltage, the resilient body 6 and the data storage disk 1 are held in quasi contact with each other. The average gap between the resilient body 6 and the data storage disk 1 is thus determined by the amplitude of the vibration caused by the standing wave.

In the art of ultrasonic motors, two-phase AC voltage i.e., AC voltages of sine and cosine waves, are applied to a piezoelectric body to produce a traveling wave, thereby enabling a movable element positioned on the piezoelectric body to rotate. In the disk drive according to the present invention, one-phase AC voltage of a predetermined frequency is applied to the piezoelectric body 5 to produce a standing wave, rather than a traveling wave, for repeatedly deforming the resilient body 6. The gap between the resilient body 6 and the disk 1 is determined by the amplitude of the standing wave.

Sine the resilient body 7 and the disk 1 are held only in quasi contact with each other, the frictional resistance between the resilient body 6 and the disk 1 is very small. The AC voltage remains applied to the piezoelectric body 5 before the disk 1 rotates or when the disk 1 stops. Therefore, when the disk 1 starts to rotate, the optical head 2 is prevented from sticking to the disk 1, or the motor for rotating the disk 1 is prevented from being excessively loaded, or the disk 1 is prevented from being damaged by shocks such as vibrations.

The gap between the optical head 2 and the disk 1 while the disk is in rotation can easily be selected or established without using a gap detector and a servo mechanism which would otherwise been required as with the conventional data storage disk drives.

Figure 5:
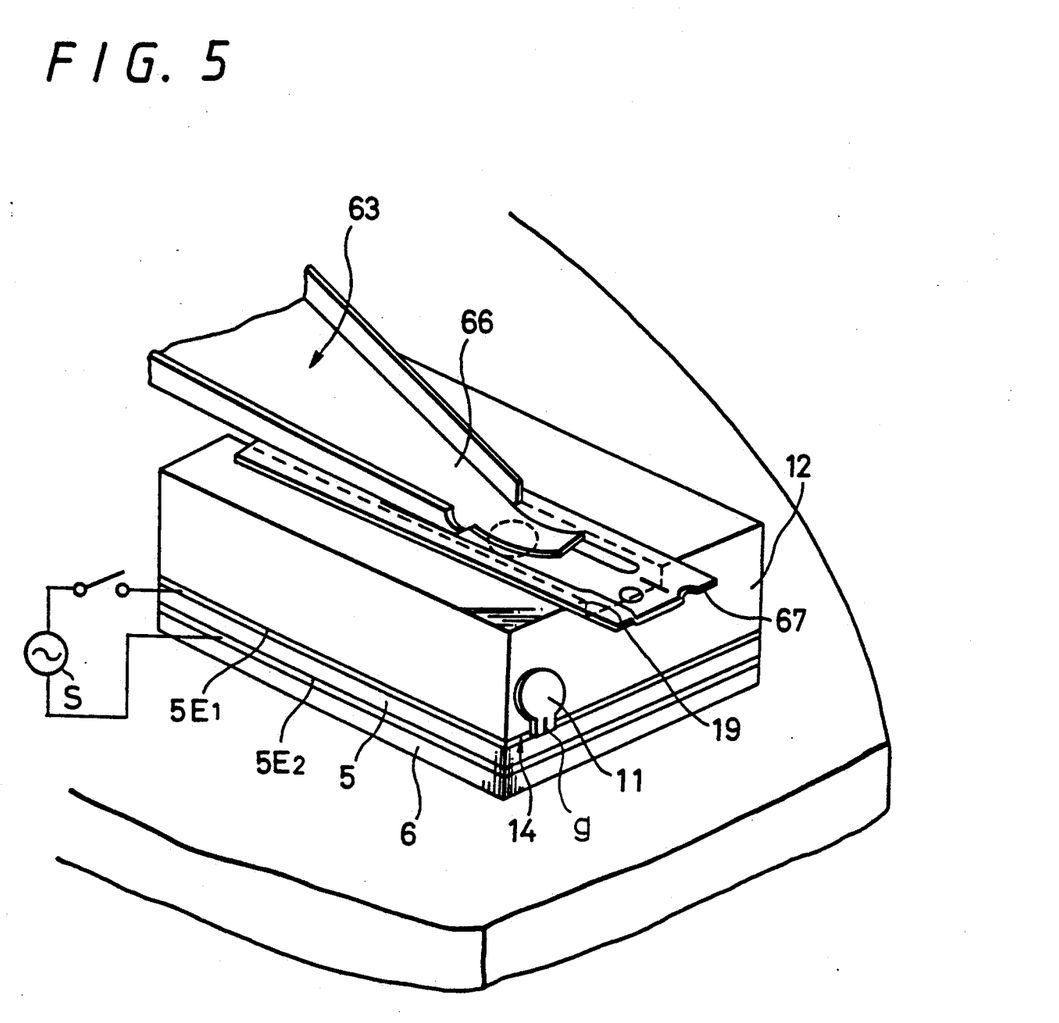
FIG. 5 is a perspective view of a portion of a data storage disk drive according to another embodiment of the present invention.

FIG. 5 shows a gimbal and associated components of a magnetic disk drive having a magnetic head, according to another embodiment of the present invention.

Those parts shown in FIG. 5 which are identical to those shown in FIGS. 2 and 3 are denoted by identical reference numerals, and will not be described in detail.

In FIG. 5, a magnetic head 11 is mounted on a support 12 that is attached to the gimbal 67. The support 12 supports, on its surface facing the magnetic disk, a relatively thin piezoelectric body 5 and a relatively thin resilient body 6, which are functionally identical to the piezoelectric body 5 and the resilient body 6, respectively, shown in FIG. 4.

The piezoelectric and resilient bodies 5, 6 may be of a rectangular shape. Electrodes $5E_1$, $5E_2$ are disposed on opposite surfaces, respectively, of the piezoelectric body 5. An AC power supply S such as a high-frequency power supply is connected between the electrodes $5E_1$, $5E_2$. The piezoelectric and resilient bodies 5, 6 may be positioned relatively to each other as illustrated, i.e., the resilient body 6 may be positioned in facing relationship to the magnetic disk, or the piezoelectric and resilient bodies 5, 6 may be switched around in position.

The magnetic head 11 is supported on the support 12 such that the magnetic gap g thereof faces the surface of the support 12 that confronts the magnetic disk.

The gimbal 67 is attached to the load beam 66 of the gimbal mechanism 63 which is of the same structure as that shown in FIG. 2. Therefore, the support 12 is normally urged toward the magnetic disk under the resiliency of the gimbal mechanism 63.

Figure 7:
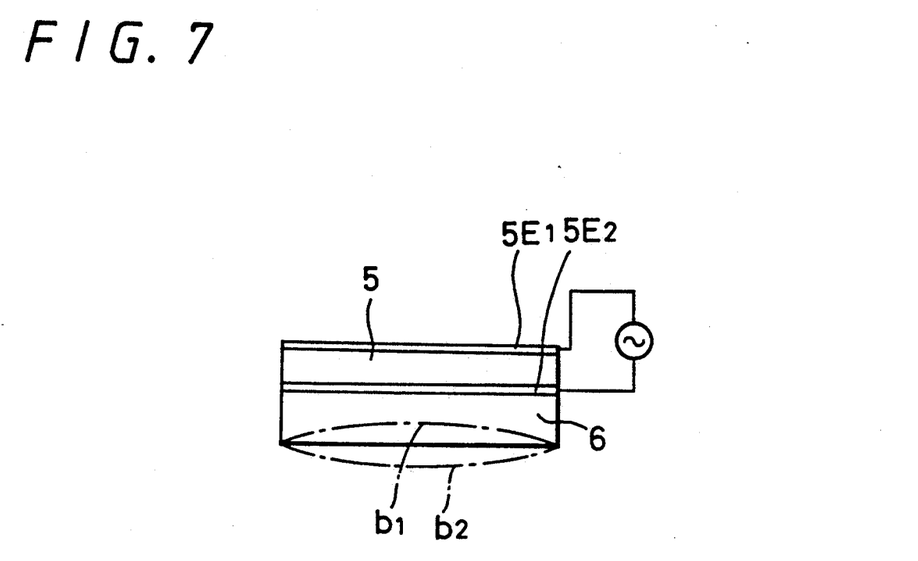
FIG. 7 is an elevational view illustrative of the manner in which the magnetic heads of the data storage disk drives according to the invention vibrate.

When an AC voltage of a certain high frequency is applied transversely to the piezoelectric body 5 by the power supply S, the piezoelectric body 5 produces a flexural standing wave in the transverse direction thereof in the same manner as described with reference to FIGS. 4 and 7. The gap between the resilient body 6 and the disk 1 is determined by the amplitude of the standing wave.

Figure 6:
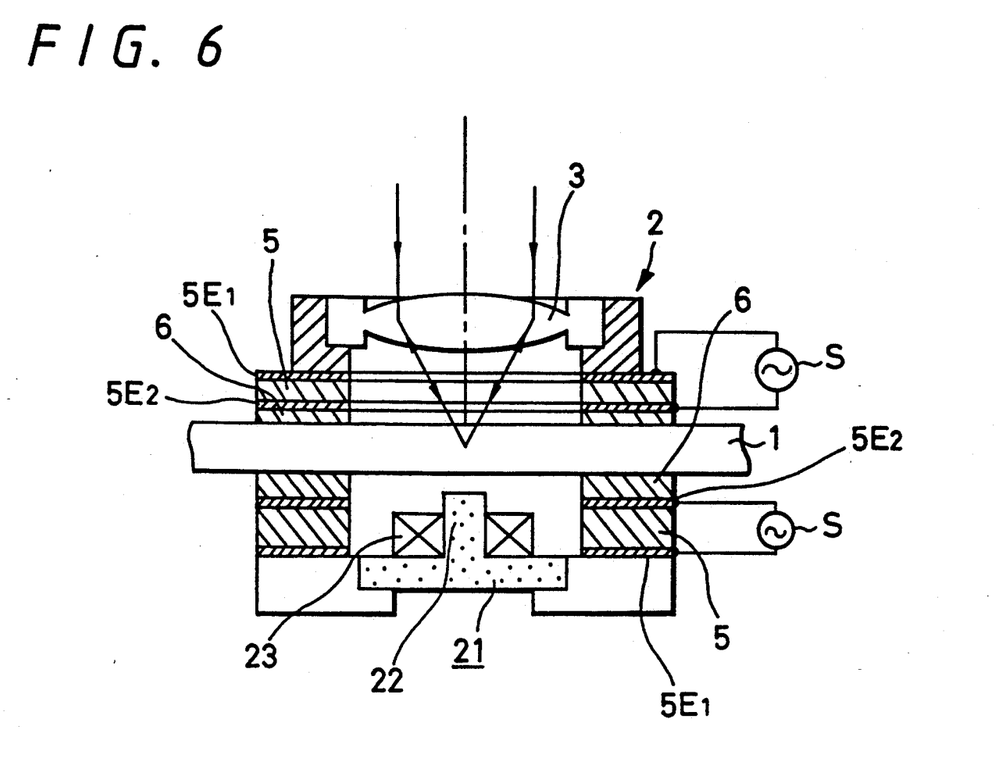
FIG. 6 is a cross-sectional view of a portion of a data storage disk drive according to still another embodiment of the present invention.

FIG. 6 shows a magneto-optic disk drive according still another embodiment of the present invention. The magneto-optic disk drive shown in FIG. 6 has a magneto-optic head assembly capable of reading data from and writing data on a magneto-optic disk 1.

As shown in FIG. 6, the magneto-optic head assembly includes an optical head 2 and a magnetic head 21 disposed one on each side of the magneto-optic disk 1. The optical head 2 is identical in structure and function to the optical head 2 shown in FIG. 4. Therefore, those parts of the optical head 2 which are identical to those shown in FIG. 4 are denoted by identical reference characters, and will not be described in detail.

The magnetic head 21 serves to generate and apply a fixed magnetic field to the magneto-optic disk 1. The magnetic head 21 comprises a core 22 of a T-shaped cross section having a central cylindrical core, and a coil 23 wound around the central cylindrical core of the core 22. The core 22 is supported on a holder which also supports a piezoelectric body 5 and a resilient body 6 on its side facing the magneto-optic disk 1, the resilient body 6 being positioned in confronting relationship to the magneto-optic disk 1. The piezoelectric body and the resilient body 6 of the magnetic head 21 are functionally identical to those of the optical head 2.

Consequently, both the optical head 2 and the magnetic head 21 are held in quasi contact with the opposite surfaces of the magneto-optic disk 1.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. A data storage disk drive for recording data on and reproducing data from a data storage disk, comprising:
   an optical head positioned in spaced relationship to the data storage disk;
   the optical head comprising a holder, an objective lens supported on the holder, a piezoelectric body and a resilient body which are mounted on a surface of the holder which faces the data storage disk; and
   means for applying an AC voltage to the piezoelectric body to produce a flexural wave for making substantially constant a gap between the optical head and the data storage disk.

2. A data storage disk drive according to claim 1, wherein the piezoelectric body is attached to the holder, and the resilient body is attached to the piezoelectric body.

3. A data storage disk drive according to claim 1, further including a pair of electrodes disposed respectively on opposite surfaces of the piezoelectric body, the means comprising an AC power supply connected between the electrodes.

4. A data storage disk drive for recording data on and reproducing data from a data storage disk, comprising:
   a support;
   a magnetic head supported on the support and positioned in spaced relationship to the data storage disk;
   a piezoelectric body and a resilient body which are mounted on a surface of the support which faces the data storage disk so that the piezoelectric body and the resilient body are together interposed between the support and the data storage disk; and
   means for applying an AC voltage to the piezoelectric body to produce a flexural wave for making substantially constant a gap between the magnetic head and the data storage disk at least while the data storage disk is rotating.

5. A data storage disk drive according to claim 4, wherein the piezoelectric body is attached to the support, and the resilient body is attached to the piezoelectric body.

6. A data storage disk drive for recording data on and reproducing data from a data storage disk, comprising:
   a support;
   a magnetic head supported on the support and positioned in spaced relationship to the data storage disk;
   a piezoelectric body and a resilient body which are mounted on a surface of the support which faces the data storage disk, and including a pair of electrodes disposed respectively on opposite surfaces of the piezoelectric body; and
   means for applying an AC voltage to the piezoelectric body to produce a flexural wave for making substantially constant a gap between the magnetic head and the data storage disk at least while the data storage disk is rotating, the means comprising an AC power supply connected between the electrodes.

7. A data storage disk drive according to claim 1, wherein the piezoelectric body and the resilient body are interposed between the holder and the data storage disk.

8. A magneto-optical data storage disk drive for recording data on and reproducing data from a magneto-optical data storage disk, comprising:
   an optical head positioned in spaced relationship to a first side of the data storage disk;
   the optical head comprising a holder, an objective lens supported on the holder, a first piezoelectric body and a first resilient body which are mounted on a surface of the holder which faces toward the first side of the data storage disk so that the first piezoelectric body and the first resilient body are together interposed between the holder and the first side of the data storage disk;
   first means for applying an AC voltage to the first piezoelectric body to produce a flexural wave for making substantially constant a gap between the optical head and the first side of the data storage disk;
   a support;
   a magnetic head supported on the support and positioned in spaced relationship to a second side of the data storage disk;

a second piezoelectric body and a second resilient body which are mounted on a surface of the support which faces the second side of the data storage disk so that the second piezoelectric body and the second resilient body are together interposed between the support and the data storage disk; and
second means for applying an AC voltage to the second piezoelectric body to produce a flexural wave for making substantially constant a gap between the magnetic head and the second side of the data storage disk.

* * * * *